United States Patent [19]

Mandeville

[11] Patent Number: 4,853,967
[45] Date of Patent: Aug. 1, 1989

[54] METHOD FOR AUTOMATIC OPTICAL INSPECTION ANALYSIS OF INTEGRATED CIRCUITS

[75] Inventor: Jon R. Mandeville, Yorktown Heights, N.Y.

[73] Assignee: International Business Machines Corporation, Armonk, N.Y.

[21] Appl. No.: 177,807

[22] Filed: Apr. 6, 1988

Related U.S. Application Data

[63] Continuation of Ser. No. 70,631, Jul. 6, 1987, abandoned, which is a continuation of Ser. No. 626,552, Jun. 29, 1984, abandoned.

[51] Int. Cl.$^4$ .............................................. G06K 9/00
[52] U.S. Cl. ........................................ 382/8; 382/49; 358/101
[58] Field of Search ............... 358/101, 106, 107, 284; 382/8, 25, 27, 49, 54, 55

[56] References Cited

U.S. PATENT DOCUMENTS

| | | | |
|---|---|---|---|
| 3,196,398 | 7/1965 | Baskin | 340/146.3 |
| 3,805,035 | 6/1971 | Serra | 235/151.3 |
| 3,846,754 | 11/1974 | Oka et al. | 340/146.3 H |
| 3,898,617 | 8/1975 | Kashioka et al. | 340/146.3 H |
| 3,940,737 | 2/1976 | Beun | 382/55 |
| 3,975,709 | 8/1984 | Beun et al. | 340/146.3 H |
| 4,014,000 | 3/1977 | Uno et al. | 340/146.3 MA |
| 4,056,716 | 11/1977 | Baxter et al. | 384/515 |
| 4,148,065 | 4/1979 | Nakagawa et al. | 358/101 |
| 4,162,482 | 7/1979 | Su | 340/146.3 H |
| 4,163,214 | 7/1979 | Komori et al. | 340/146.3 |
| 4,183,013 | 1/1980 | Agrawala et al. | 340/146.3 AC |
| 4,242,662 | 12/1980 | Tsujiyama et al. | 340/146.3 H |
| 4,345,312 | 8/1982 | Yasuye et al. | 364/515 |
| 4,386,403 | 5/1983 | Hsieh et al. | 364/300 |
| 4,442,542 | 4/1984 | Lin et al. | 382/25 |
| 4,468,808 | 8/1984 | Mori et al. | 382/20 |
| 4,481,664 | 11/1984 | Linger et al. | 382/8 |
| 4,496,971 | 1/1985 | West et al. | 382/8 |
| 4,500,202 | 2/1985 | Smyth | 382/8 |
| 4,510,616 | 4/1985 | Lougheed et al. | 382/8 |
| 4,541,114 | 9/1985 | Rutenbar et al. | 382/8 |
| 4,665,554 | 5/1987 | Sternberg | 382/27 |
| 4,692,943 | 9/1987 | Pietzsch et al. | 382/8 |

FOREIGN PATENT DOCUMENTS

0123229 10/1984 European Pat. Off. .
2124362 2/1984 United Kingdom .

OTHER PUBLICATIONS

Uno, T. et al., "Defect Detection in Complicated Patterns", *Electrical Engg. in Japan*, vol. 95, No. 2, 1975 pp. 90–97.

"Novel Method For Analysis of Printed Circuit Images", by Jon R. Mandeville, IBM Journal of Research & Development, vol. 29, No. 1, Jan. 1985.

Sternberg and Sternberg, "Industrial Inspection by Morphological Virtual Gauging," IEEE Computer Soc. Workshop on Computer Architecture for Pattern Analysis & Image Management, 1983, pp. 237–247.

K-s. Fu, "Pattern Recognition for Automatic Visual Inspection", IEEE Computer, Dec. 1982, pp. 34–40.

Abbott et al., "Computer Algorithms For Visually Inspecting Thick Film Circuits", RI/SSME Conference on Applied Machine Vision, Feb. 83, Memphis, Tenn.

T. Uno et al., "Defect Detection In Complicated Patterns", Electrical Engineering in Japan, vol. 95, No. 2, 1975, pp. 90–97.

*Primary Examiner*—Leo H. Boudreau
*Assistant Examiner*—Jose L. Couso
*Attorney, Agent, or Firm*—Philip J. Feig

[57] ABSTRACT

An image is taken of a circuit layer pattern containing circuit element representations and the areas of the circuit element representations within the image are modified. The modification includes at least one modification step which consists of thinning the circuit element representations to the point where at least some features of the circuit element representations are skeletonized, to thereby emphasize distinctive features of the circuit element representations. The emphasized distinctive features are compared with previously determined design criteria for distinctive features expected from the prior steps so that any lack of correspondence indicates a defect.

1 Claim, 14 Drawing Sheets

DEFICIENT CIRCUIT ELEMENT WIDTH AND MISSING FEATURE DETECTION

METHOD FOR AUTOMATIC OPTICAL INSPECTION ANALYSIS OF INTEGRATED CIRCUITS

This application is a continuation of application Ser. No. 070,631 filed July 6, 1987, now abandoned, which in turn is a continuation of application Ser. No. 626,552, filed June 29, 1984, now abandoned.

DESCRIPTION

Technical Field

This invention relates to an improved method for optical inspection analysis of printed circuits and integrated semiconductor circuits, which may be substantially completely automated.

As developments progress in the industry of producing integrated circuits and polycrystalline multi-component circuits, including monocrystalline multitransistor circuits and polycrystalline multi-component circuits, as well as thin film and thick film printed circuits, greater and greater circuit element packing densities are achieved, and larger boards, or chips, with more and more layers are produced, providing more and more circuit components and interconnections in a single integrated circuit structure. Such circuits may be produced by forming many successive circuit layers, and each layer must have at least a minimum quality in order to provide for a successful circuit. Because of the extreme miniaturization of the circuits, inspecting the successive layers is a serious problem. Because of the multi-layer structure, it is important to inspect each layer to correct or scrap defective circuits to reduce losses in final electrical testing. The circuits may be visually inspected through microscopes, but this s very expensive in terms of labor cost, and the inspector must exercise considerable judgment in deciding whether or not the portion of the circuit within his view at any one time reveals any defects.

Various efforts have been made to mechanize or automate all, or a part of the circuit layer inspection process. Many of these prior efforts have involved optically scanning the circuit layer and comparing that optical scan with a master pattern to determine whether the circuit layer conforms with the master pattern as a basis for judgment as to the presence of defects. One such prior effort is disclosed in U.S. Pat. No. 4,056,716 issued Nov. 1, 1977 to Baxter et al and assigned to the same assignee as the present application. Other systems in the same category are illustrated in the following additional U.S. Pat. Nos. 3,898,617, Kashioka et al; 4,014,000, Uno; and 4,148,065, Nakagawa.

Unfortunately, systems such as those referred to above require a tremendous amount of data processing capacity and memory, since a large number of comparisons are required to establish whether or not the sample under inspection conforms with the master copy. Furthermore, measurement of the degree of coincidence between the sample under test and the master copy does not necessarily establish a good economic basis for inspection because many of the visual deviations between the sample and the master do not result in practical defects leading to incorrect operation of the resulting circuit, or risks of early failure.

Other procedures have been used for comparing a test image with a reference image, such as those based upon verification of the positions of "center lines" and "borders". Still others use a statistical approach, involving the gathering of statistics on a reference circuit, and then the gathering of similar statistics on a test image, and comparison of the two as a basis for judgment as to whether there are defects.

Another approach is outlined in a technical paper entitled, "Computer Algorithms for Visually Inspecting Thick Film Circuits", by Edward H. Abbott, Michelle A. Hegyi, Robert W. Kelley, David L. McCubbrey, and Charles B. Morningstar, published at the RI/SSME Conference on Applied Machine Vision, Memphis, Tenn., February 1983. The main subject of that paper is new optical inspection methods for thick film circuits which are especially directed to circuits used in automobile ignition systems. The methods described in that paper apparently do not involve the statistical approach and do not rely upon reference to a master image, but instead rely upon design rules which specify the characteristics of the circuit without reference to a master image. This typifies another approach to the problem. A pure design rule approach can be very useful for the detection of certain defects, but it sometimes has substantial shortcomings in that false circuit elements may be present which don't belong in the circuit, but which do conform with the prescribed design rules, or required elements may be missing and the design rule inspection does not detect that fact.

At least some of the methods of the aforementioned paper are implemented by a series of nearest-neighbor transformations on individual picture elements (pixels) at the edges of an image, and may involve expansion and contraction of the image by means of such transformations. In this respect, there is a superficial resemblance to the methods of the present invention, as will appear from the following detailed description of the invention.

Another technical paper which is of interest, relating to automated optical inspection of circuit patterns is entitled "Defect Detection in Complicated Patterns" and was published beginning at page 90 of the publication *Electrical Engineering in Japan*, Vol. 95, No. 2, 1975 by the authors T. Uno, M. Mese, and M. Ejiri of the Central Research Laboratory of Hitachi Ltd. That paper also describes expansion and contraction of circuit element images. The expansion and contraction is employed as a means for analysis of circuit element patterns. The methods described by the aforementioned papers may be useful, insofar as they are described, but they do not provide answers in as simple and as straightforward a manner as the method of the present invention. Also, they differ with respect to the present invention in a very important feature which is described in the following paragraph.

In accordance with the present invention, a test image of at least a section of the circuit to be examined is modified such that, at least ultimately, at least portions of the image are skeletonized. The selective skeletonization of the image greatly simplifies the analysis of the image for the detection of faults as described in more detail below.

Skeletonization has frequently been employed in pattern recognition methods, where the objective is basically character recognition. For instance, see the following U.S. Pat. Nos. 3,196,398 Baskin, 3,846,754 Oka et al, 3,975,709 Beun et al, and 4,162,482 Su.

However, so far as is known, skeletonization has never been used in connection with optical inspection of integrated circuits. Furthermore, in accordance with the present invention, the images are skeletonized and analyzed in a very special way to derive information uniquely useful in circuit inspection and in a very simple manner.

One of the objects of the present invention is to provide an improved method for optical inspection and analysis of integrated circuits Another object of the invention is to provide an improved method for optical inspection and analysis of integrated circuits which replaces prior methods which rely on design rule principles and replaces methods which rely upon comparison with a reference model, and which is capable of combining the advantages of both approaches in a single method.

Still another object is to provide an improved method for optical inspection and analysis of integrated circuits which is extremely simple and economical in terms of the requirements for storage and recognition of distinctive 20 features representing possible defects.

Further objects and advantages will be apparent from the following description and the accompanying drawings.

SUMMARY OF THE INVENTION

In carrying out the present invention, there is provided a method for automated optical inspection of integrated circuits comprising inspecting at least one predetermined section of one circuit layer pattern for a circuit by taking an image of said section of said layer containing circuit element representations, selectively modifying the areas of the circuit element representations within said image in at least one modification step and including at least one such modification step which consists of thinning the circuit element representations to the point where at least some features of the circuit element representations are skeletonized to thereby emphasize distinctive features of the circuit element representations, detecting the emphasized distinctive features, comparing said detected features with previously determined design criteria for distinctive features expected from the prior steps to detect the correspondence of the detected features and the expected features so that any lack of correspondence indicates a defect.

DESCRIPTION OF PREFERRED EMBODIMENTS

Figure 1:
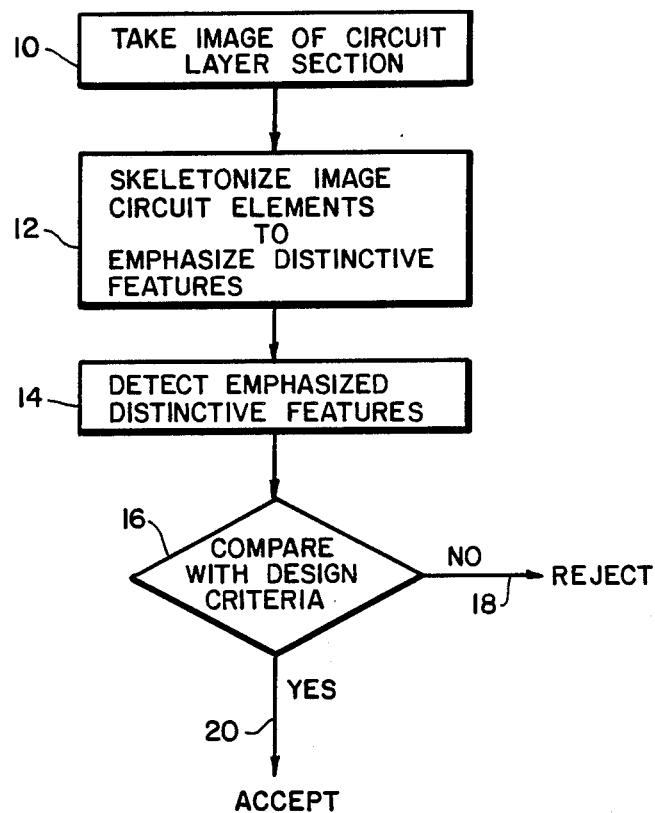
FIG. 1 is a flow chart indicating a general version of the method in accordance with the present invention.

Referring more particularly to FIG. 1, there is shown a flow chart illustrating a general form of the method according to the present invention. The method includes the steps of taking an optical image of a circuit layer section to be inspected in step 10, skeletonizing the circuit elements in the image in step 12 to emphasize distinctive features, detecting the emphasized distinctive features in step 14, and then comparing the emphasized distinctive features with design criteria in step 16 to determine whether the distinctive features are acceptable or not. If the answer is no, the part is rejected, as indicated at 18. If the answer is yes, the part is accepted in this particular test, as indicated at 20.

In the practice of the present invention, it is much preferred that the image be in "binary" form so that there is a substantially complete contrast between the circuit image areas and the background areas in step 10. Thus, the areas indicating the presence of circuit elements or conductors may be represented as black, and the background as white. The images, as initially picked up by a camera, such as a vidicon camera, do not provide this complete and absolute contrast initially. However, with an image of sufficient quality, and with sufficient contrast, thresholds can be set in the system to derive the so-called binary image. Thus, all elements in the picture darker than the threshold become black, and all elements in the picture lighter than the threshold become white. The present invention does not deal with the specific details of obtaining, and storing, and converting to binary form, a high quality image. The present invention relies upon the known art for that function. For instance, see "Digital Document Processing" by H. Hou, published in 1983 by John Wiley and Sons, New York, pp. 6 et seq. It may be postulated, however, that very good apparatus is available for the purpose of deriving high accuracy images of integrated circuit sections in accurate microscopic detail. The present invention is concerned primarily with the analysis of the optical image to detect defects.

The skeletonization step 12 of FIG. 1 is carried out by "thinning" all of the elements of the circuit image by removing increments from the edges of the circuit element representations of the image. In certain variations of the method to be described below, the circuit elements of the image may be expanded prior to being thinned by adding increments to the edges of each of the circuit element representations. While these additions or subtractions from the image representations can be carried out in various ways, the preferred method is to add or subtract individual picture elements (sometimes referred to as "pixels"). Thus, if the image is taken with a vidicon tube, and represented in a mode analogous to a television picture composed of individual pixels, the thinning is accomplished by removing pixels at the edges of the circuit element representations. Conversely, expansion is accomplished by adding pixels at the edges.

The skeletonization usually consists of thinning the circuit element representations by a predetermined amount by successive removals of layers of pixels at the boundaries, until at least some portions of the circuit element representations are completely skeletonized, such that they are usually reduced to strings of pixels which are only one pixel wide. If additional thinning is carried out beyond that point, the previously skeletonized portions are not thinned any further. Thus, the skeletonized portions remain intact and connected, if they were initially connected together.

One of the important aspects of the present invention is that the distinctive features which are emphasized by skeletonization can usually be completely defined in terms of (a) the nature of the feature in combination with (b) the coordinates of a single skeletal point within the image where the feature occurs. Since the skeletal point, by definition, consists of a single pixel, the coordinates of that pixel define the position of the feature. This makes the definition of the distinctive feature very simple, and makes it very simple to determine whether the distinctive feature is acceptable or unacceptable. This is done on the basis of a determination whether the detected feature is expected to be in the detected position based upon a table of coordinates indicating acceptable positions for such features. This is not the only kind of possible test for acceptability, as explained more fully below.

In step 14, the emphasized distinctive features are detected, usually in terms of type as well as position the detected features so emphasized are listed by type and single pixel coordinates in relatively terse designations.

Figure 6:
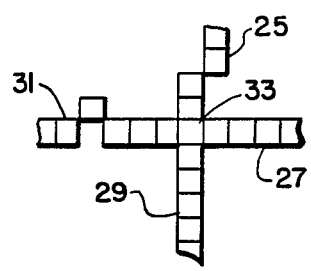
Figure 7:
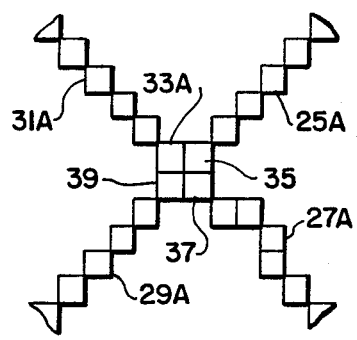

The types of distinctive skeletal features which are particularly useful in the practice of the present invention are illustrated in FIGS. 2, 3, 4, and 5 as blob-joints, T-joints, terminal ends, and pads/extraneous elements/isolated pixels, respectively. Other skeletal features which occur less frequently, but which are useful, are illustrated in FIGS. 6 and 7 as four joints/multiple-joints of various types.

The invention, simply stated, is an automatic method for optical inspection of integrated circuits, using image processing techniques to identify distinctive features in the relatively complex pixel image, thus creating a position list of features stated tersely by type parameter and location parameter, and comparing the design list with the position list to infer violations of design rules on the basis of comparison of the relatively terse feature position information. At the start, the operator loads the processor with a design list of permissible distinctive feature positions, each permissible distinctive feature position including a feature type parameter and location parameter so as to identify the desired circuit in terms of a composite statement of features at appropriate locations. The method includes the following steps:

(a) taking the pixel image of the circuit layer section (10, FIG 1) in terms of pixels at coordinate locations;

(b) modifying selectively, by controlled skeletonization (12, FIG. 1), the pixel image to emphasize features of the pixel image of the integrated circuit;

(c) identifying emphasized features of the pixel image (14, FIG. 1) in terms of feature designations each including feature type parameter and feature location parameter; and (d) comparing the identified feature designations of the position list design list of permissible distinctive feature positions.

This permits the feature identification to be made using image processing techniques appropriate to the complex pixel image, and permits comparing to be carried out on the relatively terse feature designations to determine whether the features found in the position list are appropriately matched to the design list of features permissible under the design criteria.

Figure 2:
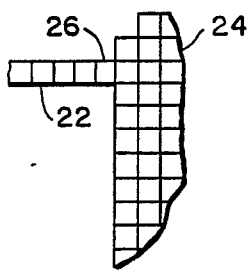
FIGS. 2, 3, 4, 5, 6, and 7 illustrate types of distinctive features which are detected in a modified circuit image in order to determine the presence of defects.

FIG. 2 illustrates a distinctive feature which is defined as a "blob" joint. A "blob" joint is a joint between a skeletonized portion 22 of a fragmentary portion of a circuit image and a blob portion 24 of that image. As illustrated, a "blob" portion is simply a portion which is not skeletonized. The locus of this joint is defined as the position of the pixel 26 in the skeletonized portion 22 which is adjacent to the blob portion 24. Thus, the coordinates of pixel 26 define the position of this blob joint.

Figure 3:
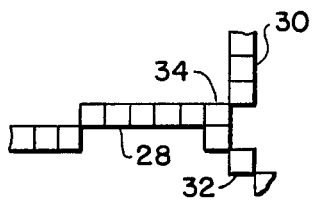

Another extremely important type of distinctive feature in the practice of the present invention is a so-called "T" joint. As illustrated in FIG. 3, this is simply a joint where three skeletonized branches of the circuit element image come together. Such a joint could be referred to just as well as a "" joint, because the joint does not have to accurately reflect the shape of the letter "T" This type of joint is illustrated in FIG. 3, where the three skeletal branches 28, 30, and 32 come together in a joint. In this instance, the position of the joint is defined as the position of the single pixel 34 which is common to all three branches. It is obvious that "T" joints may occur in many different configurations.

Figure 4:
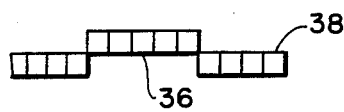

Still another extremely useful skeletal point feature recognized in the practice of the present invention is simply a terminal end feature, as illustrated in FIG. 4. In this FIG., the skeletal branch 36 simply terminates with the pixel 38. The coordinates of pixel 38 therefore define the position of this feature.

Figure 5:
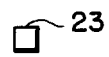

FIG. 5 represents a distinctive feature which may consist of a single pixel 23 which can occur as a result of skeletonization of a circuit element referred to as a pad, or which may result from the skeletonization of an undesired, or extraneous circuit element image.

FIG. 6 illustrates what may be referred to as a four-joint, in which four skeletonized circuit element branches 25, 27, 29, and 31 meet at an individual pixel 33. Thus, the position of pixel 33 defines the position of the distinctive feature.

FIG. 7 illustrates a situation involving a four-joint, such as that illustrated in FIG. 6, but where more than a single pixel is required at the center of the joint in order to maintain connectivity. Thus, the branches 25A, 27A, 29A, and 31A are joined at a combination of central pixels 33A, 35, 37, and 39. All of these last four mentioned pixels are required in order to maintain connectivity between the four branches of the circuit, and accordingly, none of these pixels may be eliminated. In order to define the position of the distinctive feature in terms of the coordinates of a single pixel, a rule is preferably adopted with respect to this configuration, such as the rule that the coordinates of the upper left hand pixel 33A of the four pixel array are to be taken as the position of the distinctive feature.

The combination of the four pixels 33A, 35, 37 and 39 is distinguishable from a blob, such as the blob 24, to avoid recognition of the configuration of FIG. 7 as a blob joint, or as a combination of four blob joints, because of the logical operations which recognize that all four of the central pixels are required for maintaining connectivity.

The four-joint configurations of FIGS. 6 and 7 occur much less frequently than do the features shown in FIGS. 2 through 4, and are therefore not utilized nearly as much. It will be understood that other distinctive feature joints involving five or more joined branches may also be encountered. However, these are much less likely to occur, and are not discussed in detail.

Figure 8:
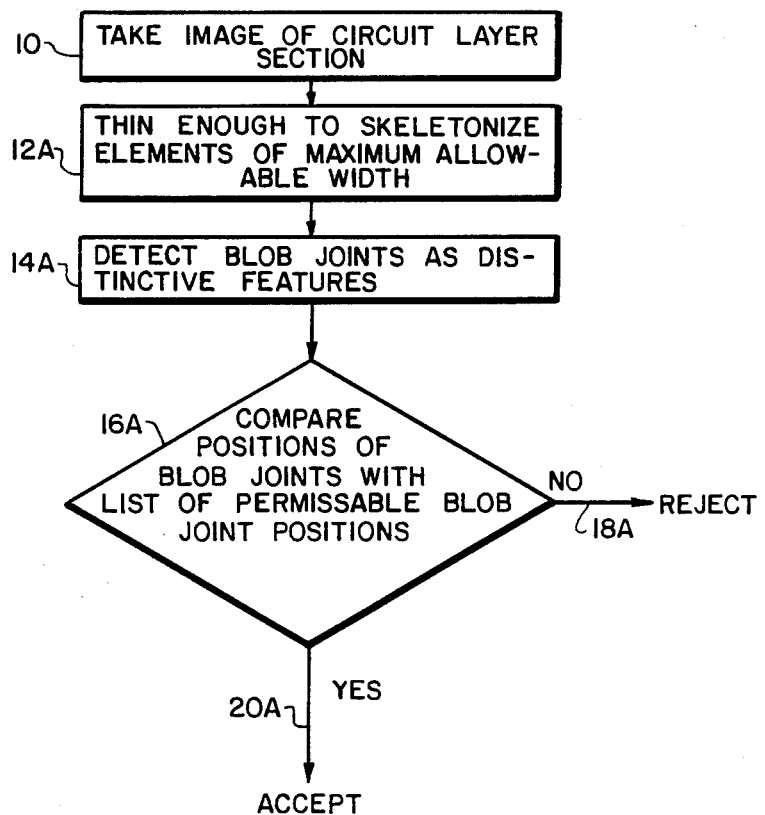
FIG. 8 is a flow chart illustrating a version of the method which is specifically directed to the problem of detecting circuit connection traces of excessive width.

FIG. 8 is a flow chart illustrating a form of the method which is specifically directed to the detection of excess widths of interconnection circuit elements. This version of the method, begins with the step 10 of taking an image of the circuit layer section which is to be inspected. Next, in step 12A, skeletonization is carried out by thinning just enough to skeletonize the elements of maximum allowable width. This means that all elements having less than maximum width, and up to the maximum width, will be skeletonized. Next, in step 14A, blob joints are detected as distinctive features. It will be apparent that circuit elements having greater than the maximum width will not be skeletonized, and accordingly, on the assumption that at least some portions of the circuit elements will not exceed the maximum width, there will be blob joints where the skeletonized maximum width (and under maximum width) circuit elements meet those that exceed maximum width.

Finally, in the comparison step 16A, the positions of blob joints are compared with a list of permissible blob joint positions. If the lists compare, so that all of the blob joints detected are permissible, the output is positive at 20. If the lists do not compare, a reject output is obtained at 18.

As will appear from the following explanations, typical circuit images may include interconnection circuit elements which interconnect circuit "pads", which are enlarged circuit areas for interconnections between circuit layers, for instance. Accordingly, the interconnection circuit elements frequently interconnect with pads. Since the pads are necessarily wider than the interconnection circuit elements, they will not be skeletonized in the above process. Accordingly, where the interconnection circuit elements connect with the pads, blob joints are expected. Thus, while the features are distinctive, if they are detected as permissible, they appropriately do not result in a rejection of the part.

Figure 9:
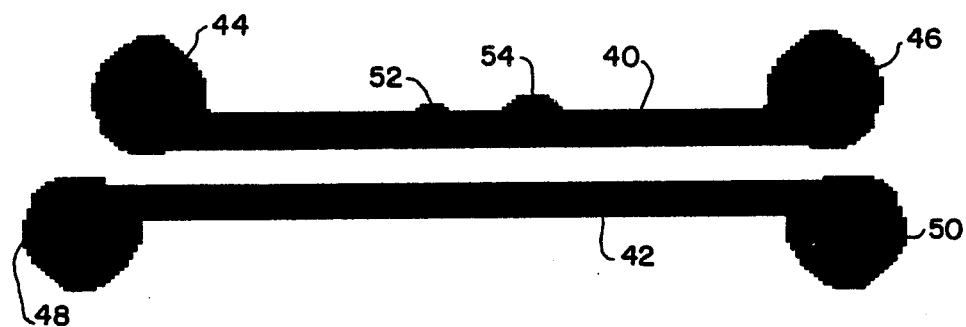
FIGS. 9 and 10 illustrate the operation of the method of FIG. 8.
Figure 10:
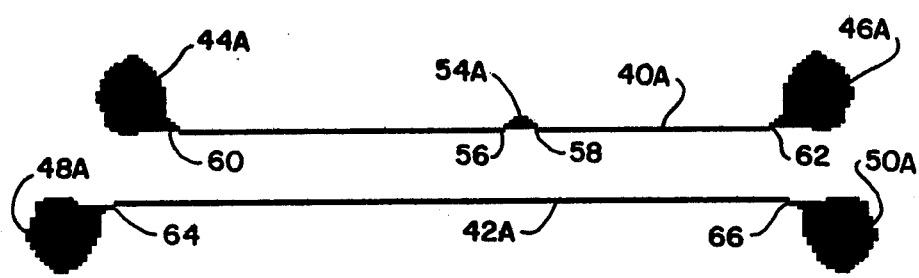

FIGS. 9 and 10 illustrate the process just described in connection with FIG. 8. FIG. 9 illustrates an image of a circuit section containing two interconnection circuit elements 40 and 42 which interconnect pads 44 and 46, and 48 and 50, respectively. The interconnection element 40 contains two protruding portions 52 and 54 which may make the interconnection element 40 exceed the maximum width in their respective areas.

In FIG. 10, all of the circuit elements of FIG. 9 have been thinned by an amount sufficient to skeletonize all portions of the interconnection elements 40 and 42 which do not exceed the maximum interconnection circuit element width. All of the features in FIG. 10 which are identifiable as deriving from features in FIG. 9 are lettered with the same numbers, but with the suffix letter "A" added. It will be seen by a comparison between FIGS. 10 and 9 that the protruding portion 52 of the interconnection circuit element 40 of FIG. 9 has been eliminated in FIG. 10. This means that, even with that protrusion, the interconnection circuit element 40 did not exceed the maximum allowable width. However, The protrusion 54 remains in FIG. 10 as a blob 54A, indicating that the protrusion 54 did cause a circuit element width in excess of the allowable maximum. Accordingly, when blob joints are detected, two unacceptable blob joints appear at 56 and 58 to indicate the presence of the excess circuit element width. These are distinguished (in step 16A of FIG. 8) from the expected blob joints at the circuit pads which occur at 60, 62, 64, and 66.

In accomplishing the comparison step 16A, it is only necessary to compare the list of coordinates defining the positions of the blob joints against a table of coordinates indicating permissible blob joint positions. Accordingly, while the positions of the permissible blob joints represent detailed design data, that data is stored and compared in a very convenient and economical manner. This is a specific illustration of one of the most important features of the present invention. As discussed more fully below, a lack of registration of the image features with the design list data on the coordinate positions can be accommodated by recognizing a correspondence of the coordinate positions within a range of values. This procedure also accommodates for variations in the positions of distinctive features which are within allowable tolerances.

When distinctive features of other kinds are detected in other variations of the method of the present invention, as described below, it is only necessary to identify the type of distinctive feature and the position of each of the features of that type in order to accomplish the desired position comparisons.

Figure 11:
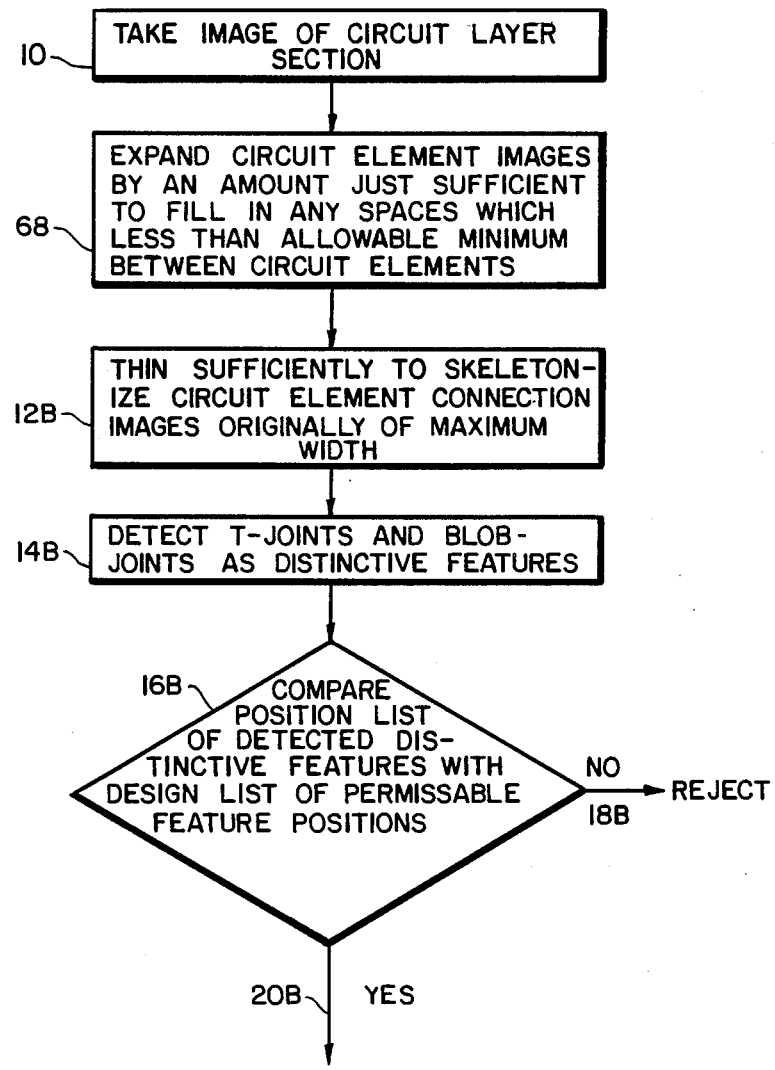
FIG. 11 is a flow chart illustrating a version of the method for detecting violations of a minimum spacing requirement between circuit elements.

FIG. 11 is a method flow chart illustrating a version of the method which is especially useful in detecting violations of minimum spacing requirements between circuit elements. The method begins with step 10 in taking an image of the circuit layer section to be inspected. In the next step 68, the circuit element images are expanded by adding pixels to the outer peripheral edges of the images of each circuit element by an amount which is just sufficient to fill in any spaces which are less than the allowable minimum spaces between circuit elements. In this manner, any spaces which are less than the allowable minimum are filled in to the point where they cause joining of adjacent expanded circuit elements.

In the next step 12B, the expanded circuit element images are thinned sufficiently to skeletonize circuit element connection images which were originally of maximum width. Thus, the thinning is sufficient to remove the pixels added in the expansion step 68 plus an amount sufficient to reduce the original width of the circuit elements to skeletonize the maximum width circuit elements. Then, in step 14B, the distinctive features consisting of T-joints and blob joints are detected. Finally, in step 16B, a comparison is made of a position list of the detected distinctive features with a design list of permissible feature positions to determine whether all of the T-joints and blob joints are permissible. If not, they indicate defects. The defect T-joints and blob joints will indicate minimum spacing violations. Needless to say, if there were actually preexisting shorts between circuit elements which are not supposed to be connected together, those shorts will turn up as spacing violations.

Figure 12:
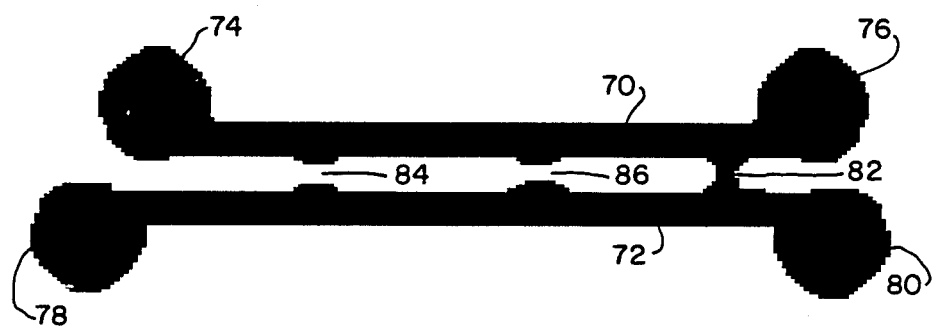
FIGS. 12, 13, and 14 illustrate the operation of the method of FIG. 11.
Figure 13:
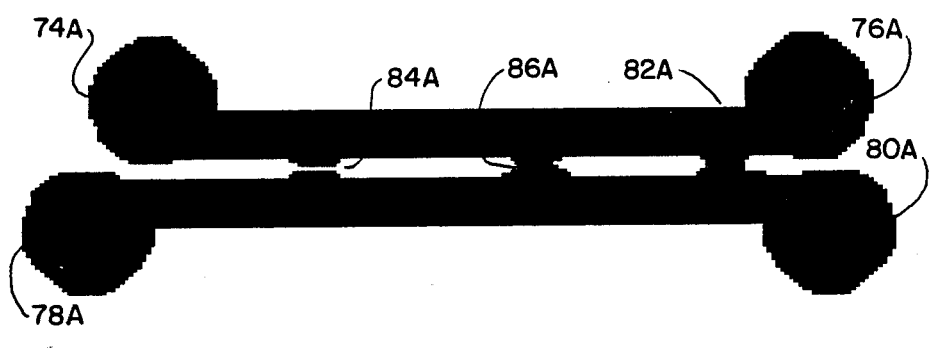
Figure 14:
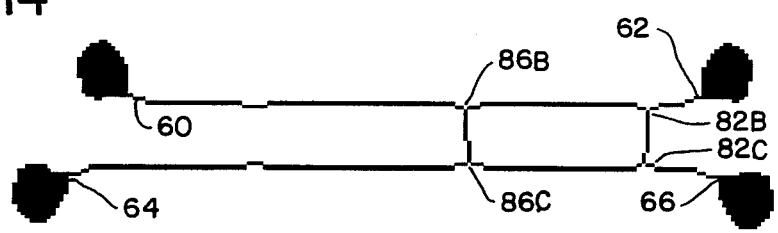

FIGS. 12, 13, and 14 illustrate the operation of the version of the method of FIG. 11.

FIG. 12 illustrates an initial image (step 10 of FIG. 11) in which two circuit interconnection elements 70 and 72 respectively interconnect circuit pad elements 74–76 and 78–80. A serious spacing defect is indicated at 82, where the interconnection elements 70 and 72 are shorted together. Other possible spacing defects are indicated at 84 and 86.

FIG. 13 illustrates the expansion step 68 of FIG. 11, in which all of the circuit elements have been expanded by an amount just sufficient to fill in any spaces which are less than the allowable minimum space between circuit elements. It is to be seen that the initial space at 86 in FIG. 12 has been completely filled in, as indicated at 86A in FIG. 13. On the other hand, the possible defect at 84 in FIG. 12 has not been completely filled in, as indicated at 84A in FIG. 13. Thus, the minimum spacing requirement was not violated at 84.

The short defect 82, of course, remains connected as before.

FIG. 14 illustrates the skeletonizing step 12B of FIG. 11 in which the expanded image of FIG. 13 is thinned sufficiently to skeletonize circuit element connection images originally of maximum allowable width. This results in distinctive features consisting of T-joints 86B, 86C, 82B, and 82C. These T-joints will not be on any design list, and accordingly, they indicate the defect of a violation of minimum spacing because of the skeletonized interconnections giving rise to the T-joints. If the violations of minimum spacing have also violated the maximum circuit element width requirement, the non-permissible distinctive features at 86B and C, and 82B and C might have been blob joints instead of T-joints. Blob joints will also be detected at the connections to the pads, as indicated at 60, 62, 64, and 66. However, these are obviously permissible distinctive features.

Figure 15:
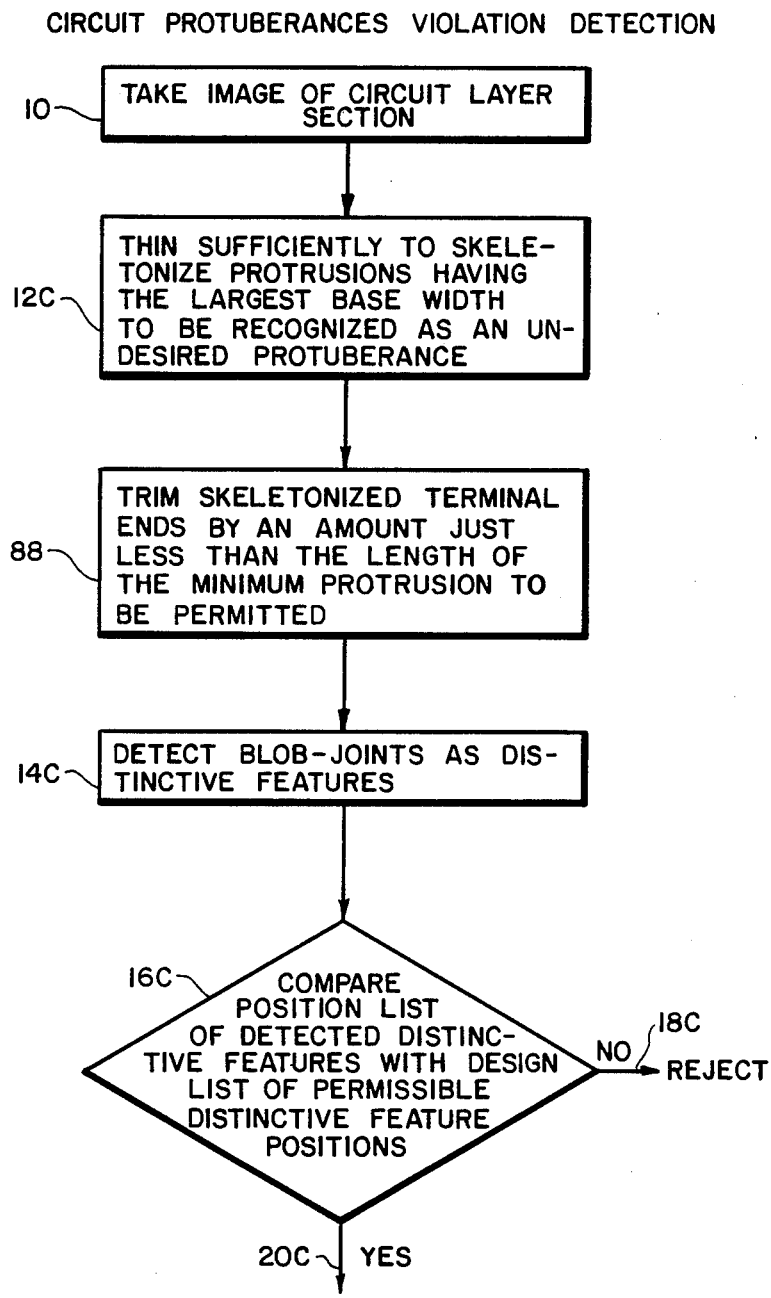
FIG. 15 is a flow chart illustrating a version of the method for the detection of circuit 15 element protuberances which exceed allowable limits.

FIG. 15 is a method flow chart illustrating a version of the method of the present invention which is specifically directed to the problem of detecting protuberances which violate previously determined standards. In certain integrated circuit layers, it is important that there should not be undesired protuberances beyond a certain size. Furthermore, the detection of protuberances may be employed instead of, or in supplementation to, other related tests such as for a violation of a maximum circuit element width specification as discussed above in connection with FIG. 8.

As shown in FIG. 15, this version of the method again starts with the step 10 of taking an image of the circuit layer section to be inspected. In step 12C, the image is thinned sufficiently to skeletonize all protrusions having the largest base width which is to be recognized as an undesired protuberance. This means that protrusions having a larger base width will not be skeletonized, while those having a lesser base width will be skeletonized.

In step 88, after the skeletonization, the 15 terminal ends of the skeletonized protrusions are trimmed by simply removing a predetermined number of pixels from those terminal ends, in an amount just less than the length of the minimum protrusion which is to be permitted. Thus, if the skeletonized protrusions exceed that length, they will not be trimmed off altogether. Then, in the next step 14C, blob joints are detected as distinctive features. This will detect all of the skeletonized protrusions which exceeded the maximum permitted.

Finally, in the comparison step 16C, the position list of detected distinctive features is compared with the design list of permissible distinctive feature positions to determine whether the blob joints arise from undesired protuberances, or from expected blob joint features, such as connections to pads.

Figure 16:
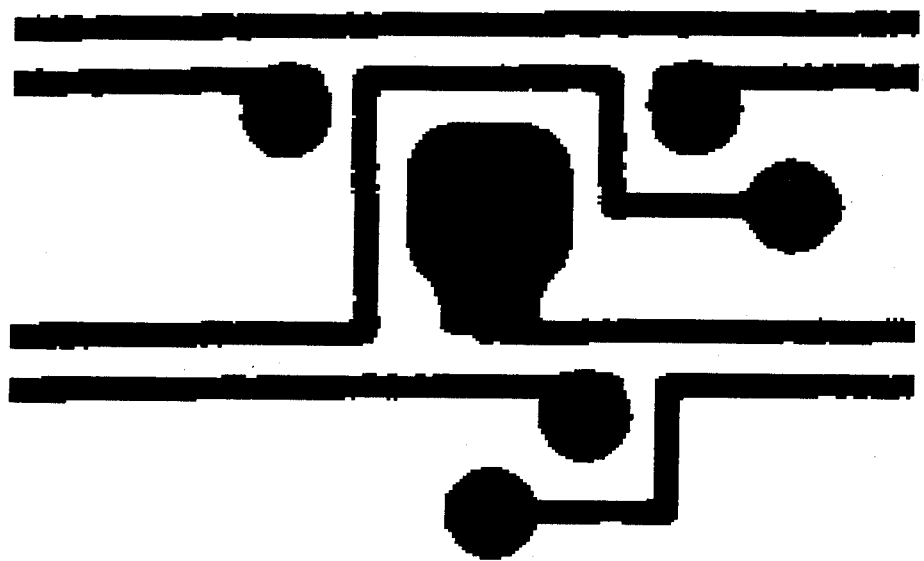
FIGS. 16, 17, 18, and 19 illustrate the operation of the method of FIG. 15.
Figure 17:
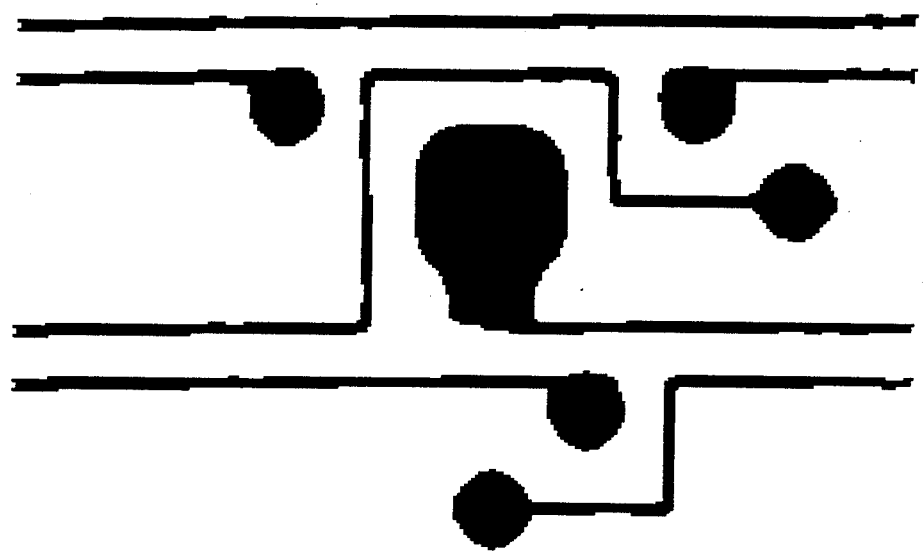

FIGS. 16, 17, 18, and 19 illustrate the operation of the form of the method shown and explained in connection with FIG. 15. FIG. 16 shows a typical image of a circuit layer which has no substantial protrusion defects. FIG. 17 illustrates the result from thinning the image of FIG. 16 by an amount which would be sufficient to show up undesired protuberances.

Figure 18:
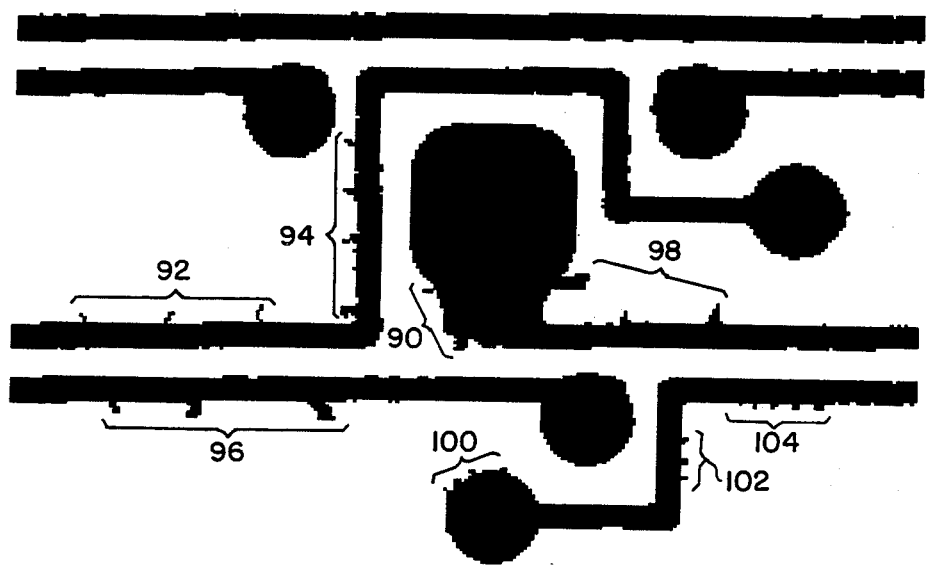

FIG. 18 illustrates a circuit image which is similar to FIG. 16, but containing protrusions of various sizes, as indicated at 90, 92, 94, 96, 98, 100, 102, and 104. In accordance with step 12C of FIG. 15, the image of FIG. 18 is thinned sufficiently to skeletonize protrusions having the largest base width which is to be recognized as an undesired protuberance. This results in the skeletonized image of FIG. 19, except that the image in FIG. 19 has also been trimmed to trim the skeletonized terminal ends by an amount just less than the length of the minimum protrusion to be permitted in accordance with step 88 of FIG. 15.

Figure 19:
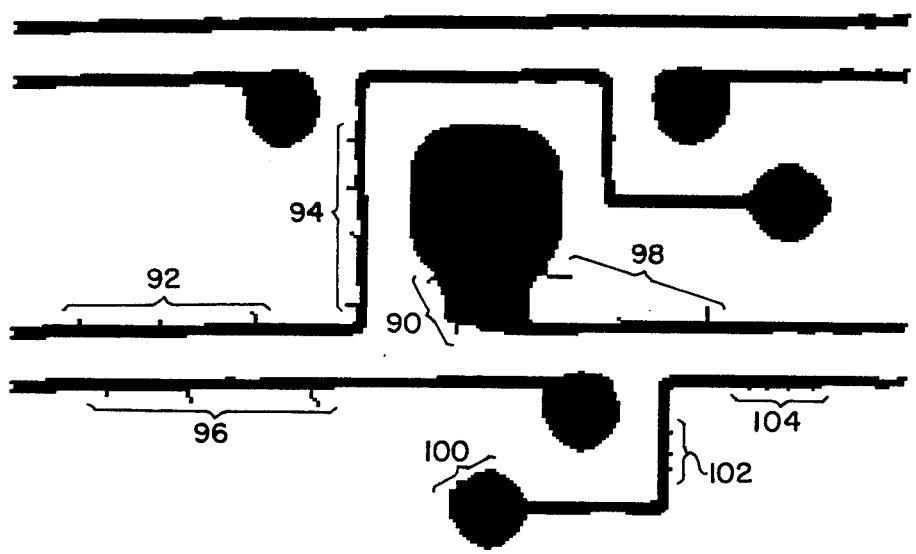

As can be seen from FIG. 19, the skeletonized and trimmed protrusions at 90, 92, 94, 96, and 98 all result in blob joints, clearly indicating undesired protuberances, while the protrusions at 100, 102, and 104, have been substantially eliminated in the trimming operation so that they are not detected as blob joints, and do not represent undesired protuberances. In other words, these protrusions are not of sufficient seriousness to be recognized as making the circuit defective.

While the comparison step 16C of FIG. 15 mentions a comparison of the position list of detected distinctive features with a design list of permissible distinctive feature positions, in the example of FIGS. 18 and 19, it is not really necessary to compare the blob joints with a design list, since there are no other blob joints created in the skeletonization in this particular circuit section image. Thus, this particular inspection method for this particular circuit relies entirely upon a design rule that any protrusions which still show up as blob joints after the skeletonization and trimming in FIG. 19 do represent defects. This illustrates the principle that in some forms of the method of the present invention, design rules alone are sufficient to establish whether or not defects exist.

Figure 20:
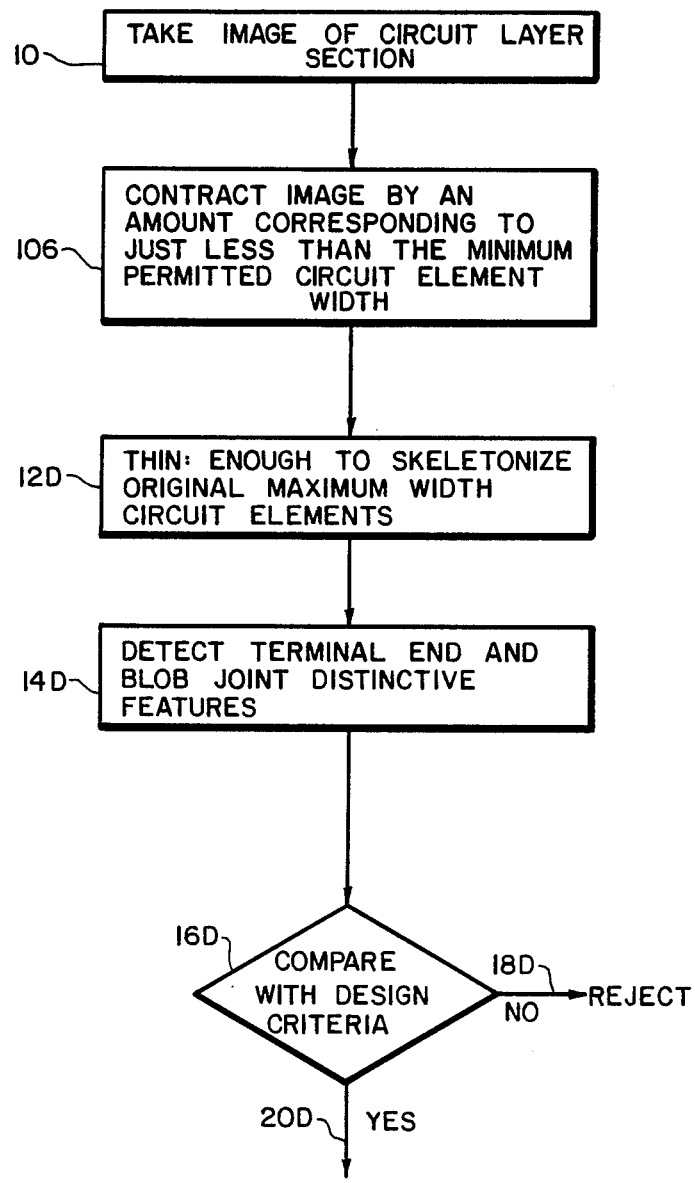
FIG. 20 is a flow chart illustrating a version of the method for detecting a violation of a minimum trace connection width requirement in the circuit.

FIG. 20 is a method flow chart for a version of the method particularly directed to the purpose of detecting deficient circuit element width. This sort of deficiency includes the detection of open circuits.

As before, the process begins with the acquisition of an image of the circuit layer section to be checked, as indicated in step 10. Next, in step 106, the image is contracted by an amount corresponding to just less than the minimum permitted circuit element width. As used herein, the term "contract" is defined as a reduction or trimming of the edges of each of the image circuit elements by a prescribed amount, without relationship to skeletonization. In other words, the contraction operation does not stop when a skeletal width is reached, but rather continues to cause a circuit element of less than minimum width to disappear. Thus, in step 106, if a circuit element has less than the minimum width, the portion which has less than minimum width will disappear. This means that, after the subsequent thinning in step 12D, terminal end points will be found as distinctive features in the image where no such terminal end points should appear. The terminal end features are detected in step 14D, and if any are found which are not in the design lit, as compared in the comparison step 16B, they will result in a rejection of the circuit section.

Blob joints are also detected in step 14D, and if any blob joints are called for in the design list which are not found in step 14D, it is an indication of missing features which should be in the circuit. The same is true of terminal end features in the design list which are not found in the circuit.

Figure 21:
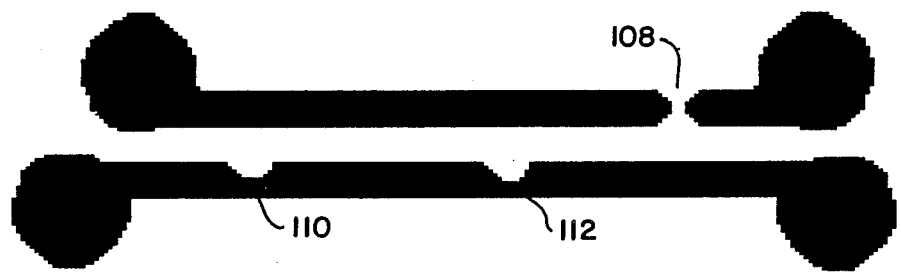
FIGS. 21, 22, and 23 illustrate the operation of the method of FIG. 9.
Figure 22:
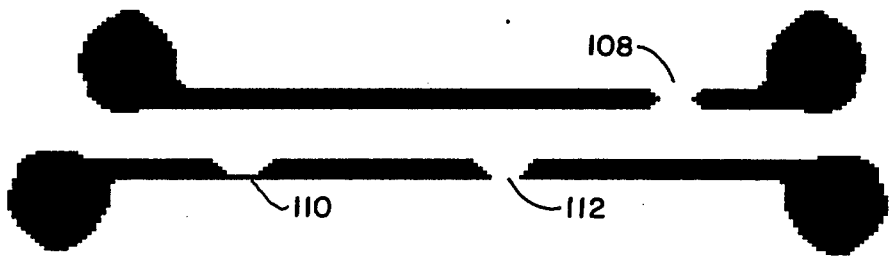
Figure 23:
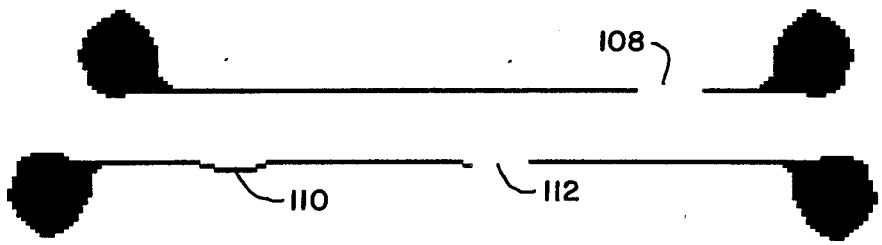

FIGS. 21, 22, and 23 illustrate the operation of the method in the form detailed in FIG. 20. FIG. 21 illustrates circuit element images which appear to have deficient element widths at 108, 110, and 112.

In FIG. 22, the images of FIG. 21 have been contracted in accordance with the method step 106 of FIG. 20. The contraction has been carried out by an amount corresponding to just less than the minimum permitted circuit element width. The defect 108, which was already an open circuit, is not really changed in nature. The defect 110 has been reduced to a mere skeleton. However, the fact that continuity is still maintained indicates that at least the minimum circuit element width was present in the initial image at this location. At defect 112, the contraction has caused an opening to occur in the image, indicating that less than the minimum allowable width of circuit element was present.

In the subsequent skeletonizing operation in accordance with step 12D of FIG. 20, the skeletonized figures are produced, as shown in FIG. 23. As shown in FIG. 23, the original open circuit at 108, and the defective circuit element width at 112 have resulted in terminal end features in the skeletonized image, while there is no distinctive feature at 110, since the minimum circuit element width specification was not violated.

Figure 24:
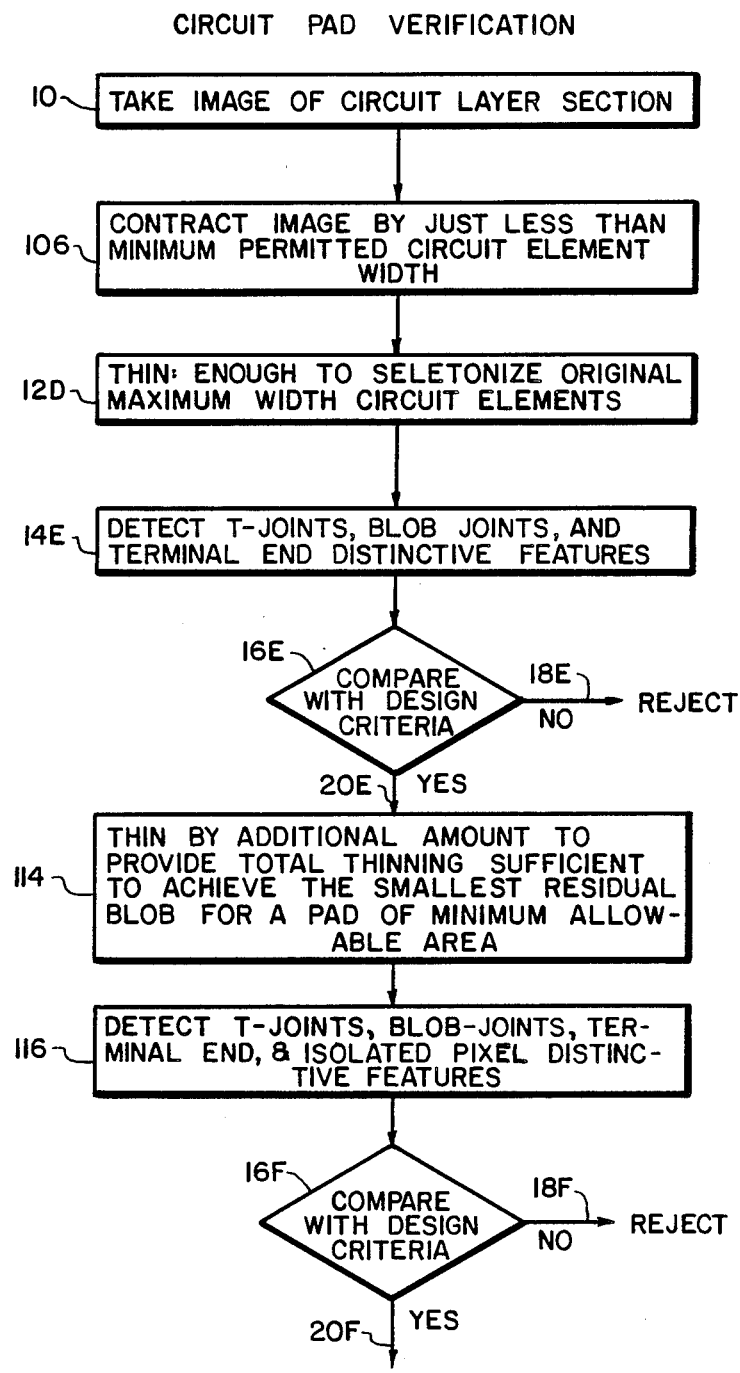
FIG. 24 is a flow chart illustrating a version of the method which is specifically directed to the verification of the presence and integrity of connection pads in the circuit under inspection.

FIG. 24 is a method flow chart illustrating a version of the method of the present invention which is especially directed to the task of verification of circuit pads. The first three steps in the flow chart of FIG. 24 are identical to the first three steps in the flow chart of FIG. 20. In a practical embodiment, when the method of FIG. 20 and the method of FIG. 24 are both to be followed, these three steps 10, 106, and 12D need not be repeated, but are performed for both methods at the same time. Also, in step 14E, the tests of detecting blob joints and terminal end distinctive features are repeated from the step 14D of FIG. 20. Obviously, these steps can be performed just once for the purposes of the method of FIG. 20 as well as the method of FIG. 24. Additionally, T-joint distinctive features are detected in step 14E of FIG. 24. The detection of these features, and the comparison of these features with a design list in step, 16E results in the detection of cracks, voids, and extraneous metalization (possible hard shorts) when detected T-joint features are not in the design list. Furthermore, the comparison carried out at step 16E can be used to verify the existence and position of all pad to trace connections. Thus, any pad to trace connections which should be present will be signified by a blob joint at the requisite position, as called for by the design criteria. Therefore, if the design criteria call for blob joints at particular positions, and such blob joints are not detected in step 14E, a defect is indicated. The detection of terminal end distinctive features which are not on the design list indicate, as in the method of FIG. 20, that a circuit trace ends improperly, with an open circuit.

In the method of FIG. 24, after the test at step 16E is satisfactorily passed, an additional thinning step 114 is carried out to the point where total thinning is sufficient to achieve the smallest area for each pad which will be recognized as a residual blob when beginning with a pad which has a minimum allowable area. Thus, if a pad has less than the minimum allowable area, there will be no residual blob, but only a skeletonized terminal end. Then, in the next step 116, when T-joint, blob joint, terminal end, and isolated pixel distinctive features are detected and compared in the comparison step 16F, the detection of a terminal end feature where there should be the combination of a residual pad and a blob joint, indicates insufficient pad area. Additionally, the presence of unexpected T-joints, as well as terminal end and isolated pixel features can be used to detect cracks, voids or breaks in the existing pads.

The detection of isolated pixels where they shouldn't exist also may indicate undesirous or extraneous circuit features.

The detection of isolated pixels after skeletonization is also a very useful additional test in each of the other methods described above.

Figure 25:
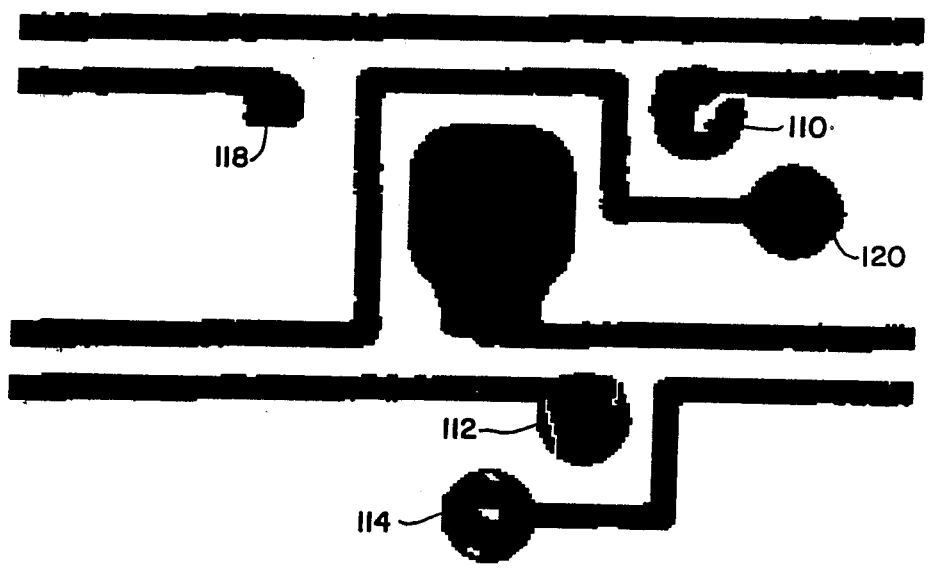
FIGS. 25 and 26 illustrate the method of FIG. 24.
Figure 26:
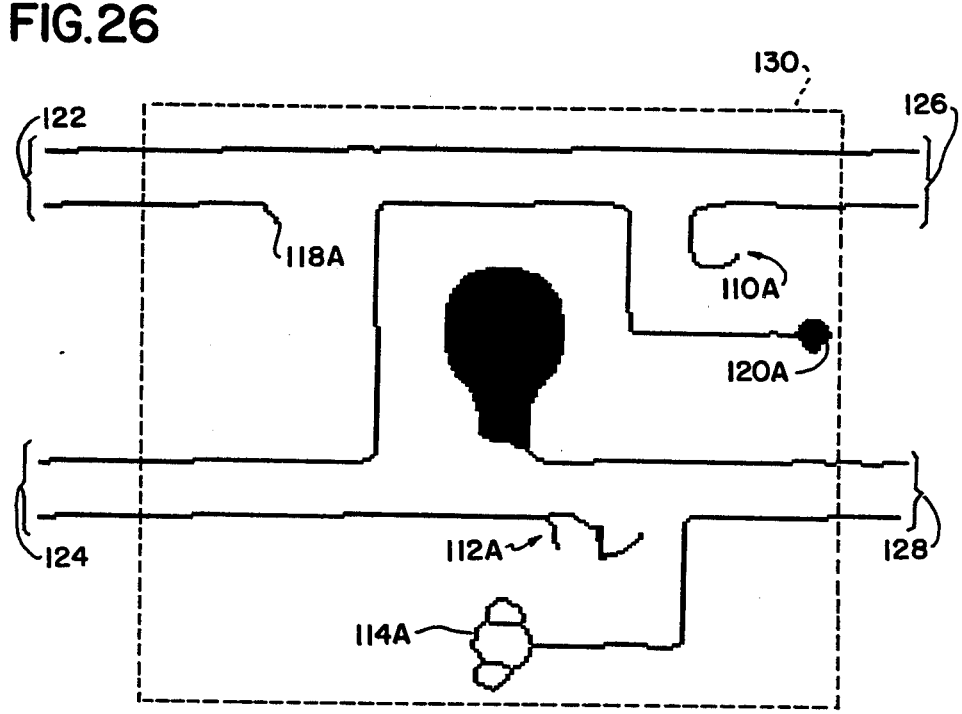

FIGS. 25 and 26 further illustrate the method just described in connection with FIG. 24. FIG. 25 illustrates a circuit image which is similar to that of FIG. 16, but which is defective in various respects. For instance, the pad 118 is undersized, the pad 110 and the pad 112 have cracks, and the pad 114 contains voids. Pad 120 appears to be normal.

FIG. 26 illustrates the condition of the image after the completion of the thinning step 114 in FIG. 24. As shown at 118A the reduced area pad 118 has been skeletonized to a terminal end distinctive feature, without a blob to indicate that there was an adequate pad. By comparison, the pad 120 of FIG. 25 is indicated as satisfactory because there is still a residual blob 120A in FIG. 26 which is detectable by the presence of a blob joint. The pads 110 and 112 containing cracks have also been reduced to terminal end features, as indicated at 110A and 112A. The voids in pad 114 have been transformed by the thinning into a FIG. 114A which contains a number of T-joints. Thus, the T-joint distinctive features, which appear in positions not expected under the design criteria in those positions, signify the defect of pad voids. The defects in the pads 110, 112, and 114 may not necessarily result in rejection of the circuit, depending upon the design rule specifications. However, it is obviously useful to be able to identify these defects in this simple manner.

In FIG. 26, the ends of the skeletonized circuit traces shown at 122, 124, 126, and 128 will be detected as terminal end features. However, it is obvious that these ends really arise simply because they occur at the boundaries of the section of the circuit which is being inspected. Thus, these terminal end features do not represent defects. In order to avoid false indications of defects of this kind, it is possible to limit the detection of terminal end features to such features which occur within a more restricted frame of view, indicated by the dotted box 130 in FIG. 26.

A number of useful embodiments of the method of the present invention have been described in some detail above. However, it will be understood that the principles of the method may be embodied in other similar procedures, and combined with other methods for analysis of optical information about circuits.

While it may be theoretically possible to carry out the various versions of the method of the present invention without the use of computers, as a practical matter it is essential to use computer technology in order to achieve adequate speed in the operations described. In one practical embodiment, various versions of the method were implemented by programming a standard commercially available image processing computer, the VIACOM VDC model 1600.

Figures 27, 28, 29:
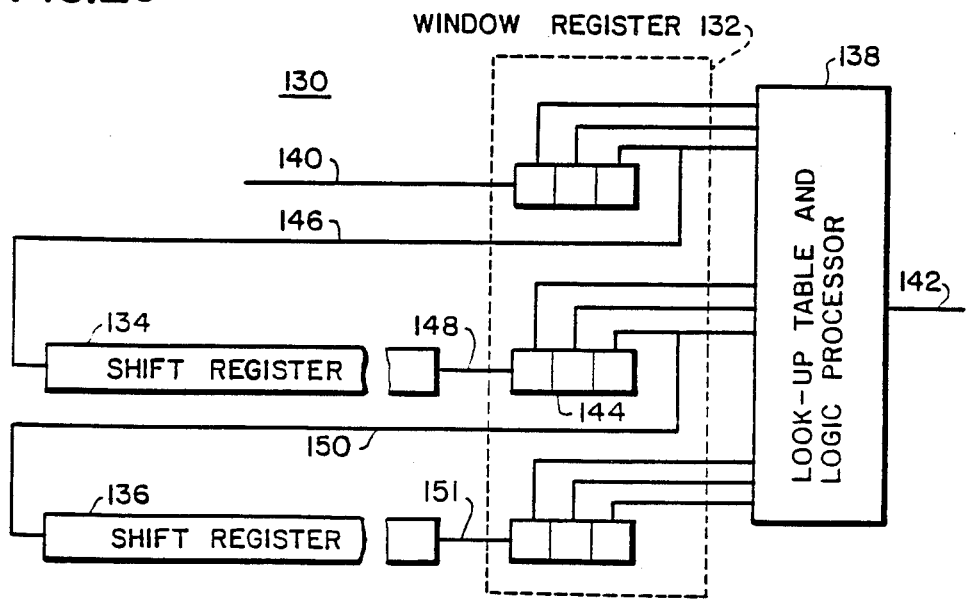
FIG. 27 illustrates an eight neighborhood arrangement of pixels which is useful for explaining a preferred procedure for expansion, contraction, thinning, and other modifications of the images dealt with in the present invention
FIG. 28 illustrates a four neighborhood array of pixels which is useful in explaining preferred methods for expansion, contraction, thinning, and other modifications of the images in accordance with the present invention.
FIG. 29 is a schematic representation of a processing element which is preferably used for processing data for carrying out the present invention.

In implementing the method, and particularly in computer implementation, it has been found to be very useful to employ an arrangement in which individual 3×3 arrays of pixels are analyzed in order to identify a distinctive feature, or in order to accomplish expansion, contraction, or thinning. In carrying out these operations, the relationship of the center pixel to the other eight pixels is determined as a basis for determining what status or change the center pixel is to have. The eight pixels surrounding the center pixel are referred to as the "eight-neighbor" pixels in an "eight neighborhood" which includes the eight neighbors and the center pixel. FIG. 27 illustrates the relationships, where the center pixel is indicated by a letter "X", and the eight-neighbor pixels are indicated by the character "0". The adjustments and comparisons are made by comparing the eight-neighbors of each pixel with standard eight-neighborhood pixel patterns, which may be cataloged and stored in a computer memory. If a certain pattern is detected, or if a combination of certain patterns is detected in the eight-neighborhood, then the center pixel is changed in a certain way (such as changed from black to white in a thinning or contraction operation) or recognized as identifying one of the distinctive features. This may be referred to as "template matching". For expansion operations, a white center pixel which is determined, through template matching to be at the edge of the image, may be changed from white to black. For certain operations, such as expansion or contraction of an image, decisions may be made on the basis of only four of the eight-neighbors, those in direct vertical and horizontal alignment with the center pixel, as illustrated by the four pixels marked with the number 4 in FIG. 28. These are referred to as the four-neighbors. In expansion, it is sometimes preferred to alternate between expansion operations using the eight-neighbors, and expansion operations using the four-neighbors. This results in what is referred to as octagonal expansion.

Similarly, alternating eight-neighbor and four-neighbor contraction is referred to as octagonal contraction.

The alternation of eight-neighbor processing and four-neighbor processing is preferably used in conjunction with the thinning operations where the purpose is for detection of pad areas having circular or octagonal shapes. This results in what may be referred to as octagonal thinning.

The data is conveniently processed in the 3×3 arrays by means of a processor 130 which has a configuration which is schematically illustrated in FIG. 29. This processor is sometimes referred to below as simply a processing element. The processor 130 includes a window register 132, two shift registers 134 and 136, and a lookup table and logic processor 138. The bit stream of pixel bit data is fed into the processing element at an input connection 140, and the result of the processing, in the form of a stream of data bits, appears at an output connection 142. The individual register cells of the window register 132 store the nine bits of an eight-neighborhood configuration concurrently in order to determine what decision is to be made with respect to the center bit stored in the cell 144.

In order to accomplish this function, successive sets of eight-neighborhood bits, together with the bit stored in cell 144 are fed through the system. Thus, the data stream supplied at input 140 is fed first to the upper row of cells of window register 132, and then recirculated through a connection 146 to the input of a shift register 134 which delays the data until the beginning of the next raster line of data is to be read, so that when the original data is supplied at connection 148 to the second row of storage cells in window register 132, they are in vertical registration with the new data appearing in the first row of data cells of register 132. In like manner, the output from the center row of cells is fed through a connection 150 to the shift register 136, and supplied to the bottom row of cells of the window register 132 at connection 151 so as to be in registration with the other associated bits of the eight neighbor group. The status of each of the cells provides an input to the lookup table and logic processor 138, which applies the various tests (templates) to the eight-neighborhood groups to determine what output should be supplied on connection 142.

Figure 30:
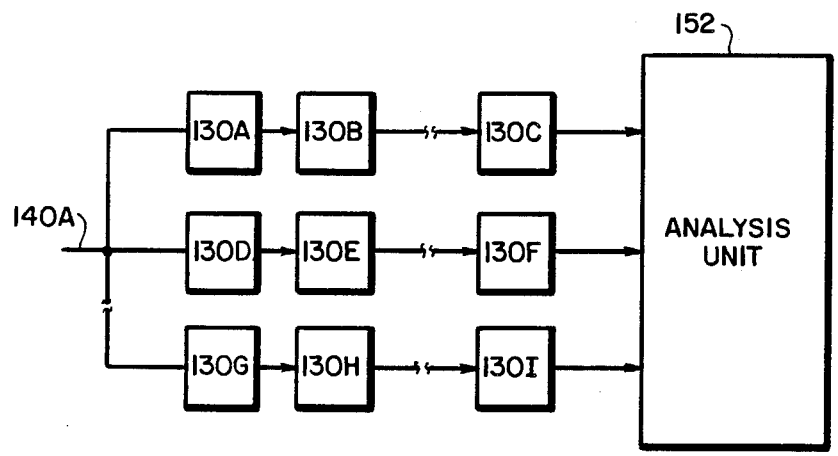
FIG. 30 schematically illustrates an arrangement of separate parallel arrays (sometimes referred to as "pipelines") of the processing elements of FIG. 29, and which are connected in cascade for the purpose of efficiently processing the data required to carry out the method steps discussed in connection with the various flow charts.

In order to achieve sufficient speed in processing the relatively complex pixel image data necessary for applying the tests, making the changes in images, and analyzing the results, it is preferred that a number of the processing elements 130 of FIG. 29 be connected in cascade, and preferably also in separate parallel arrays. FIG. 30 schematically illustrates such an arrangement including a series of processing elements 130A, 130B, and 130C in a first cascade connected combination, 130D, 130E, and 130F in a second cascade combination, and 130G, 130H, and 130I in a third cascade connected combination, all three combinations being connected in parallel to receive an input data stream at connection 140A. Each cascade connected combination is sometimes referred to as a "pipeline" The outputs of these various cascade connected combinations of processing elements are all connected for analysis to an analysis unit 152. Each of the cascaded groups of processing elements may be arranged and programmed to perform one version of the method of the present invention, such as outlined for instance in any one of the specific flow chart FIGS. 8, 11, 15, and 24.

Figure 31:
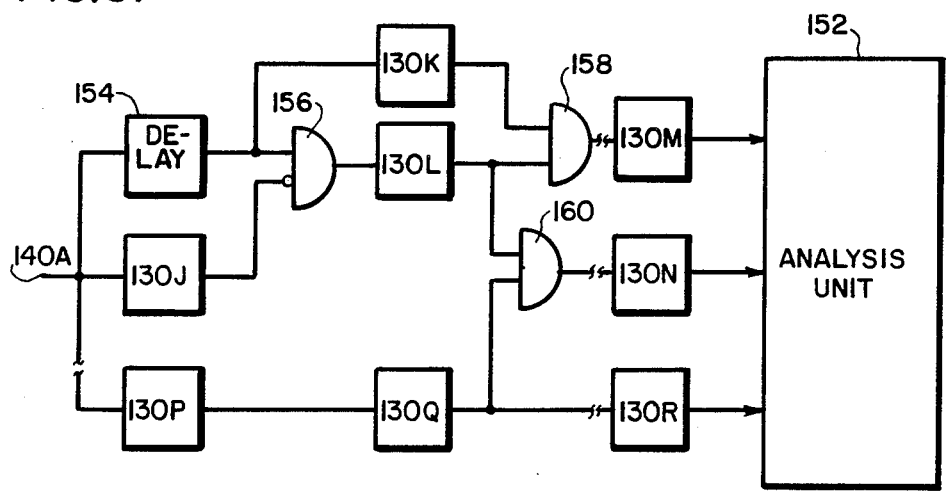
FIG. 31 illustrates an example of a preferred modification of the pipeline combination of FIG. 30 providing for reconfigurable logical cross connections between the "pipelines" of processing elements.

In order to provide the greatest flexibility and efficiency in processing the data, it is preferred that logical interconnections be permitted between the processing elements 130 of the different pipelines of FIG. 30. This sort of an arrangement is illustrated in FIG. 31. As illustrated in that figure, a logical combination element 156 is connected between the first pipeline and the second pipeline, to perform a logical operation based on data from the two pipelines and to provide an output into the remainder of the first pipeline. As illustrated, where no processing is required at the first processing element stage in the first pipeline, a delay element 154 may be substituted for the processing element 130A. The output of delay element 154 is connected as one input of the logic gate element 156, the other input of which is the output of the first processing element 130J of the second pipeline. The output of logic element 156 is supplied as the input to the processing element 130L. The output from that processing unit is combined in a logic element 158 with the output from a processing unit 130K to provide a modified output to logic unit 130M. In similar manner, the output from processing elements 130L and 130Q are logically combined in a logic element 160 to provide the input to processing element 130N. In this manner, various processing functions as described in the various method flow charts can be accomplished very expeditiously with a single pass through the processing element pipelines. It will be understood that the pipelines can be substantially longer than illustrated in FIGS. 30 and 31.

The logical interconnections between pipelines are preferably reconfigurable so as to permit arrangement of the pipelines to accomplish different functions at different times.

As mentioned earlier, in comparing detected distinctive features with a design data list, it is one of the important advantages of the invention that simple tables of coordinates of the feature positions may be stored and dealt with by the computer. It was also mentioned above, that in checking to see whether necessary design list features are present, it is possible to determine whether the detected features are detected at positions within a predetermined range of the design list position for that feature. It is one of the important aspects and advantages of the present invention that it is a simple matter to program the computer to require that the detected feature be within certain tolerance limits with respect to the position required by the design list. Thus, it is a simple matter to adjust the tolerances with respect to permitted positions of circuit features on the circuit under inspection.

Similarly, as implied from the preceding description, it is a simple matter to specify maximum and minimum circuit element trace widths which are to be required and minimum spacings between circuit elements which are to be required, and other design rules.

One of the strongest advantages of the invention is that the pertinent data with respect to the design specifications, as well as detected 10 distinctive feature information is extremely efficiently stored in a computer, consisting only of terse statement as to the nature of the distinctive feature together with coordinates for the locus of that feature. This is believed to represent an important improvement in the field of automated image analysis.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

Having thus described the invention, what is claimed as new, and desired to secure by letters patent is:

1. An automatic method for optical inspection of integrated circuits, using an automatic inspection processor, comprising loading the processor with a design list of permissible distinctive feature positions, each permissible distinctive feature position including a feature type parameter and location parameter so as to identify the desired circuit in terms of a composite statement of features at appropriate locations, the method including the following steps:
   (a) taking a pixel image of the circuit layer section in terms of pixels at coordinate locations;
   (b) modifying selectively, by controlled skeletonization, the pixel image to emphasize features of the pixel image of the integrated circuit by thinning by a finite series of thinning steps resulting in skeletonization thin enough to contrast the pixel image by an amount for causing a circuit element of less than the minimum permitted circuit element width to disappear, and thinning enough to skeletonized original maximum width circuit elements, leaving features identifiable as T-joints, blob-joints and terminal ends at locations wherein the circuit element was appropriate in form to the feature type;
   (c) identifying emphasized features n the pixel image in terms of a position list of feature designations each including feature type parameter and feature location parameter further including detecting such T-joints, blob-joints and terminal ends as distinctive features from which violations may be inferred upon unfavorable comparison with the design list;
   (d) comparing the position list with the design list to infer violations and terminate upon occurrence of violation or proceed absent violation for pad verification;
   (e) thinning by an additional amount to provide total thinning sufficient to achieve the smallest residue blob-joint for a pad of minimum allowable area;
   (f) detecting T-joints, blob-joints, terminal ends and isolated pixel distinctive features, and
   (g) comparing the position list with the design list, includes detecting such T-joints, blob-joints, terminal ends and isolated pixel features as distinctive features from which pad violations may be inferred upon unfavorable comparison with the design list.

* * * * *